US011040455B2

(12) United States Patent
Haddadin

(10) Patent No.: US 11,040,455 B2
(45) Date of Patent: Jun. 22, 2021

(54) ROBOT SYSTEM AND METHOD FOR CONTROLLING A ROBOT SYSTEM

(71) Applicant: HADDADIN BETEILIGUNGS UG, Munich (DE)

(72) Inventor: Sami Haddadin, Hannover (DE)

(73) Assignee: HADDADIN BETEILIGUNGS UG, Munich (DE)

( * ) Notice: Subject to any disclaimer, the term of this patent is extended or adjusted under 35 U.S.C. 154(b) by 507 days.

(21) Appl. No.: 15/766,080

(22) PCT Filed: Oct. 10, 2016

(86) PCT No.: PCT/EP2016/074250
§ 371 (c)(1),
(2) Date: Aug. 8, 2018

(87) PCT Pub. No.: WO2017/060538
PCT Pub. Date: Apr. 13, 2017

(65) Prior Publication Data
US 2018/0361594 A1    Dec. 20, 2018

(30) Foreign Application Priority Data

Oct. 8, 2015  (DE) ..................... 10 2015 012 959.7

(51) Int. Cl.
*B25J 13/08*    (2006.01)
*B25J 9/16*     (2006.01)
*G05B 19/423*   (2006.01)

(52) U.S. Cl.
CPC .......... *B25J 13/081* (2013.01); *B25J 9/1656* (2013.01); *G05B 19/423* (2013.01); *B25J 13/084* (2013.01); *G05B 2219/36418* (2013.01)

(58) Field of Classification Search
CPC .... B25J 13/081; B25J 13/084; B25J 13/1656; G05B 19/423; G05B 2219/36418
See application file for complete search history.

(56) References Cited

U.S. PATENT DOCUMENTS 4,804,304 A    2/1989  Tellden et al.
4,984,175 A *  1/1991  Toyoda .................... B25J 9/042
                                                    700/261
(Continued)

FOREIGN PATENT DOCUMENTS

AT         509927 A2    12/2011
CN       201437046 U     4/2010
(Continued)

OTHER PUBLICATIONS

U.S. Appl. No. 15/752,574, filed Feb. 13, 2018, Haddadin et al.
(Continued)

*Primary Examiner* — Nicholas Kiswanto
(74) *Attorney, Agent, or Firm* — Dilworth IP, LLC

(57) ABSTRACT

The present invention relates to a robotic system having at least one robotic arm, a control unit for controlling the robotic arm and a robotic arm sensor system, wherein the controller and robotic arm sensor system are designed to respond to predetermined haptic gestures of the user acting on the robotic arm in such a way that the robotic system performs at least one predetermined operation associated with the haptic gesture.

11 Claims, 1 Drawing Sheet

(56) References Cited

U.S. PATENT DOCUMENTS

| | | | | |
|---|---|---|---|---|
| 5,103,149 A * | 4/1992 | Kimura | G05B 19/423 318/568.1 |
| 6,285,920 B1 * | 9/2001 | McGee | G05B 19/423 219/125.11 |
| 8,170,719 B2 * | 5/2012 | Tsusaka | B25J 13/085 700/257 |
| 8,423,189 B2 | 4/2013 | Nakanishi et al. | |
| 8,494,677 B2 * | 7/2013 | Mizutani | G05B 19/423 700/250 |
| 8,824,777 B2 * | 9/2014 | Choi | G06K 9/00201 382/153 |
| 9,114,530 B2 * | 8/2015 | Tsusaka | B25J 9/1656 |
| 9,393,687 B2 * | 7/2016 | Hietmann | B25J 9/0081 |
| 9,486,920 B2 * | 11/2016 | Fudaba | B25J 9/1656 |
| 9,592,608 B1 * | 3/2017 | Bingham | G05B 19/423 |
| 9,597,797 B2 * | 3/2017 | Ponulak | B25J 9/161 |
| 9,804,593 B1 * | 10/2017 | Davis | G05B 19/423 |
| 9,919,416 B1 * | 3/2018 | Bingham | B25J 9/0081 |
| 10,150,214 B2 * | 12/2018 | Jerregard | B25J 9/1633 |
| 10,635,074 B2 * | 4/2020 | Schreiber | G05B 19/423 |
| 2005/0222714 A1 * | 10/2005 | Nihei | G05B 19/423 700/264 |
| 2008/0016979 A1 | 1/2008 | Yasumura et al. | |
| 2009/0259412 A1 * | 10/2009 | Brogardh | B25J 9/1633 702/41 |
| 2009/0314120 A1 | 12/2009 | Larsson et al. | |
| 2013/0151010 A1 | 6/2013 | Kubota et al. | |
| 2013/0255426 A1 | 10/2013 | Kassow et al. | |
| 2013/0273818 A1 | 10/2013 | Guan et al. | |
| 2015/0094855 A1 * | 4/2015 | Chemouny | B25J 9/023 700/259 |
| 2018/0200880 A1 * | 7/2018 | Meissner | G05B 19/423 |

FOREIGN PATENT DOCUMENTS

| | | |
|---|---|---|
| CN | 102302858 A | 1/2012 |
| CN | 102410342 A | 4/2012 |
| CN | 104802156 A | 7/2015 |
| DE | 199 56 176 A1 | 10/2001 |
| DE | 699 21 721 T2 | 11/2005 |
| DE | 10 2005 054575 B3 | 4/2007 |
| DE | 10 2008 062622 A1 | 6/2010 |
| DE | 10 2010 063222 A1 | 6/2012 |
| DE | 10 2013 013679 A1 | 2/2014 |
| DE | 10 2013 109753 A1 | 3/2014 |
| DE | 10 2014 216514 B3 | 9/2015 |
| EP | 1435737 A1 | 7/2004 |
| EP | 1880809 A1 | 1/2008 |
| EP | 2129498 A1 | 12/2009 |
| EP | 2131257 A1 | 12/2009 |
| EP | 2851162 A2 | 3/2015 |
| EP | 2864085 A2 | 4/2015 |
| JP | H08281580 A | 10/1996 |
| JP | 2008-23642 A | 2/2008 |
| WO | WO 2009/124904 A1 | 10/2009 |
| WO | WO 2011/107143 A1 | 9/2011 |
| WO | WO 2014/162161 A1 | 10/2014 |
| WO | WO 2015/113757 A1 | 8/2015 |

OTHER PUBLICATIONS

U.S. Appl. No. 15/766,083, filed Apr. 5, 2018, Haddadin.
U.S. Appl. No. 15/766,094, filed Apr. 5, 2018, Haddadin.
PCT/EP2016/069339, dated Oct. 17, 2016, International Search Report and Written Opinion.
PCT/EP2016/069339, dated Feb. 20, 2018, International Preliminary Report on Patentability.
PCT/EP2016/074250, dated Jan. 30, 2017, International Search Report and Written Opinion.
PCT/EP2016/074251, dated Feb. 2, 2017, International Search Report and Written Opinion.
PCT/EP2016/074252, dated Feb. 2, 2017, International Search Report and Written Opinion.

* cited by examiner

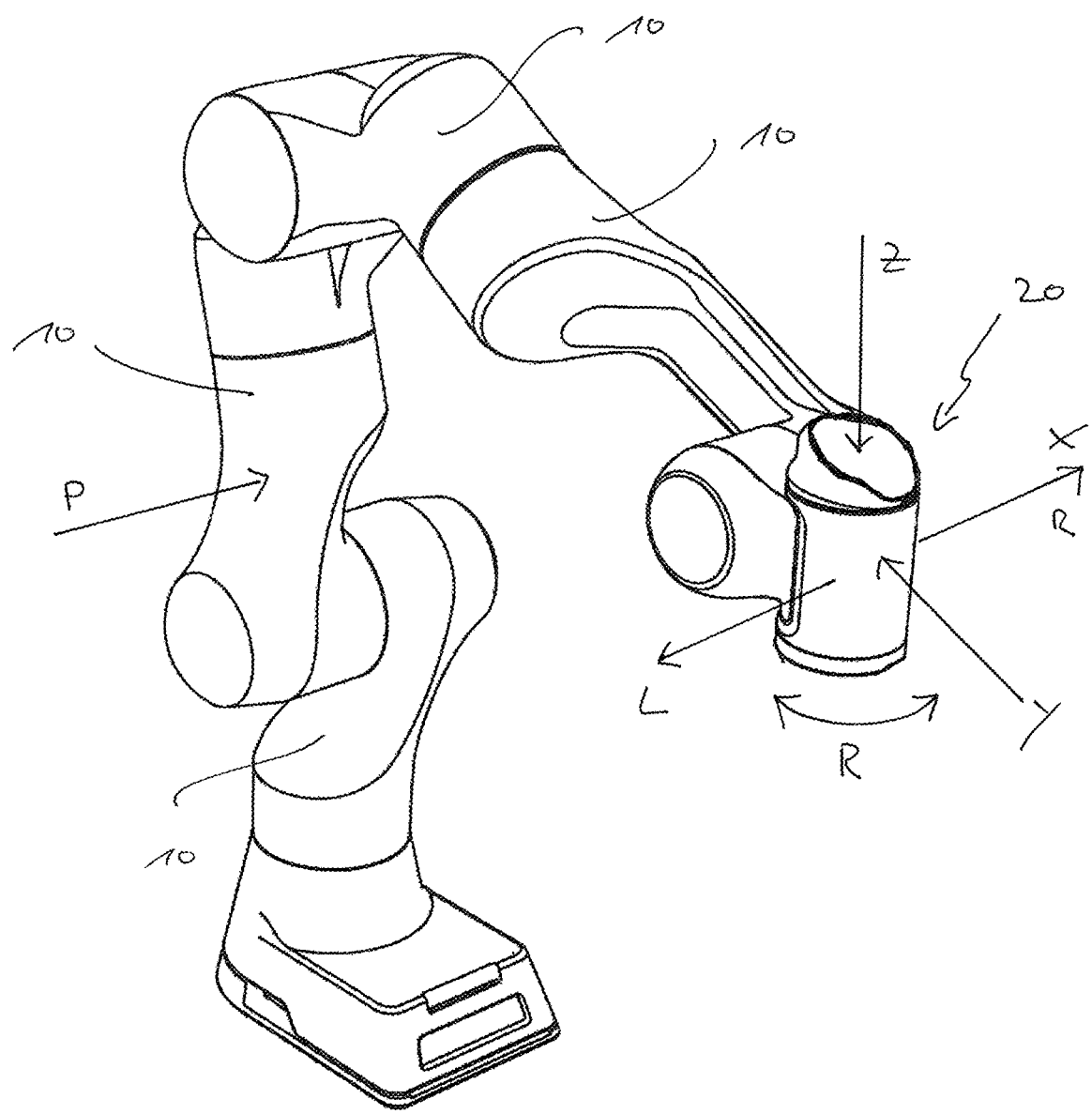

ROBOT SYSTEM AND METHOD FOR CONTROLLING A ROBOT SYSTEM

RELATED APPLICATIONS

This application is a national stage filing under 35 U.S.C. § 371 of International Patent Application Serial No. PCT/EP2016/074250, filed Oct. 10, 2016, entitled "Robot System and Method for Controlling a Robot System," which claims priority to German application serial number 10 2015 012 959.7, filed Oct. 8, 2015. The entire contents of these applications are incorporated herein by reference in their entirety.

The present invention relates to a robotic system and a method for controlling a robotic system.

Usually, robotic systems are programmed in such a way that an operator enters the necessary commands for the robotic system, e.g. as part of a programming or parameterization of the robotic system, by means of a separate device, for example a computer, via a corresponding user interface.

Furthermore, it is known to provide separate input devices directly on the robotic system, for example directly on a robotic arm, such as switches or keys, by means of which different operations can be activated on the robotic arm and then performed. Such operations include e.g. movement of the robotic arm in space, emergency shutdown in case of danger, confirmation of a position, etc. . . . . The operator always moves in the immediate vicinity of the robotic system.

In addition, in a direct human-robot collaboration (HRC), only the positioning of the end effector on the robotic arm is usually performed by haptic interaction between human and robot, in which the human manually moves the robotic arm to the desired position.

A continuing and usually more complex interaction is currently only carried out via additional input devices, as is the case with the programming or parameterization of the robotic system.

For this type of collaboration, it is necessary for the user to repeatedly switch back and forth between robot guidance and the actuation of the additional input device. This is cumbersome and can also lead to dangerous situations, as the user has to concentrate on the input devices again and again and let the potentially moving robot out of sight.

Based on that, it is an object of the present invention to expand the interaction between humans and a robotic system and thereby to provide an improved HRC environment. In addition, a simpler operability of the robotic system shall be provided to control various operations that are either performed by the robotic system itself or in a functional connection therewith.

This object is achieved with a robotic system having the features according to claim 1 and with a method for controlling a robotic system having the features according to claim 10.

The invention thus proposes a robotic system comprising at least one robotic arm, a control unit for controlling the robotic arm, and a robotic arm sensor system, wherein the controller and robotic arm sensor system are adapted to respond to predetermined haptic gestures of the operator acting on the robotic arm, so that the robotic system performs at least one predetermined operation associated with the haptic gesture.

For this purpose, the allocations between the possible haptic gestures and the associated operations are stored in a memory that cooperates with the controller.

The invention is preferably, but not exclusively, directed to robotic systems designed for manual guidance by an operator. These have integrated force and torque sensors, which can be used according to the invention and accordingly also adapted to receive the external forces, moments and torques acting by the haptic gestures of an operator on the robotic arm or only on parts of its arm members and to forward the same to the control unit.

The forces, moments and torques can be detected by various sensors, such as force measuring sensors, torque sensors, etc., which are located either in the joints, in the base and/or generally in the structure of the robotic system. It is also conceivable that the housing structure of a robotic arm is at least partially covered with a tactile skin, which allows an input via one or more fingers.

In one embodiment, the control unit may accordingly be designed to assign the forces and/or moments generated by the haptic gestures to different operations depending on their respective directions and/or their respective course.

In a further embodiment, the control unit may be configured to assign the forces and/or moments generated by the haptic gestures to different operations depending on their respective variables.

It is also possible that the control unit is designed to assign a different chronological sequence of haptic gestures to different operations, which are then carried out in a logical sequence.

The invention has the advantage that the sensor system already present in these robotic systems are not only used to support a mere position control of the end effector and trajectory control of the robotic arm, both during operation and during programming, but can also be used, by an operator by means of haptic gestures, such as pulling, pressing, pushing, turning, to receive deliberately generated forces, moments and torques and to supply the same to a further abstract interaction between humans and the robotic system.

In a preferred embodiment, the robotic system, comprises a display device with a graphical user interface, in its simplest form a computer connected to the robotic system for control or programming purposes. According to the invention, the haptic gestures can then be assigned to a control on the graphical user interface. The control can be done in two or three dimensions. In this embodiment, the operator can move a cursor or a menu navigation on the user interface by targeted spatially directed pressure on the robotic arm.

The operator does not necessarily need the help of a graphical user interface in order to receive corresponding confirmations or feedback of his actions from a programming system.

Thus, it can be provided according to the invention that the control unit is designed to generate a feedback in response to the haptic gesture.

The feedback can be auditory and/or visual.

Preferably, however, this feedback can also be made haptically detectable by the operator. For such a case, the control unit is configured to vary the degree of compliance for the mobility of the robotic arm while the haptic gesture is applied thereto.

For example, if the operator pushes laterally against an arm member of the robotic arm, the resistance of the robotic arm to the pressure exerted by the haptic gesture can be successively increased to provide the operator with appropriate feedback. The increase in the resistance can be effected by a corresponding control of drive units arranged in the hinge points between arm members of the robotic arm.

The feedback generated thereby can then serve as an orientation in more complex interactions, such as haptic menus, or as a type of acknowledgment when a predetermined haptic gesture has been detected by the control unit.

The invention further relates to a method for controlling a robotic system, which has at least one robotic arm, a control unit for controlling the robotic arm and a robotic arm sensor system, comprising the steps:

manipulating the robotic arm by at least one predetermined haptic gesture;

generating signals by the robotic arm sensor system in response to the predetermined haptic gesture;

transmitting the signals into the control unit; and assigning the signals to different predetermined operations by the control unit.

Further steps of the method according to the invention comprise generating at least one feedback in response to the different predetermined operations; as well as adjusting of the compliance of the robotic arm depending on a predetermined haptic gesture.

It will become clear that the invention uses components already existing in the robotic system in a simple manner in order to expand the area of interactions for such a robotic system.

In principle, there are no limits to the way in which predetermined haptic gestures are to be assigned to various predetermined operations.

The principle of haptically controlled guidance of the robotic arm, while the robotic arm itself functions as an input device, can be used for various interactions.

Thus, such a control can be used for example in the programming of the robotic system and also in the parameterization of individual operations to be performed, which can reduce setup times while minimizing costs for such robotic systems.

In addition, it is conceivable that during operation the robotic system is haptically controlled in a HRC-environment. For example, a strong blow by the operator against the robotic arm may signal an emergency in the work area, forcing the robotic system to shut down. This shortens the response time because the operator does not need to get close to an emergency switch to operate it.

Further features and advantages will become apparent from the following description of an embodiment shown with reference to the only FIG. 1.

FIG. 1 shows a perspective view of a multi-axle lightweight robot, which is composed of a plurality of articulated arm members 10 connected to one another.

Using the example of the front (distal) member 20, which cooperates with an end effector, not shown, the possible directions are indicated schematically, which can act by haptic gestures on the robotic system.

Thus, it is possible for an operator to exert tensile or compressive forces on the member 20 in the X-, Y-, Z-directions.

A light push on the member 20 in the Z-direction, for example, may symbolize the pressing of a push-button, this haptic gesture is then assigned to a start command that activates a predetermined operation.

By pushing the member 20 sideways to the left (L) or to the right (R), the operator can be guided through a complex menu of a graphical user interface on a display device, not shown, such as the screen of a computer. By pressing in the Z- or Y-direction, the entry selected in the graphical menu by these haptic gestures can then be confirmed.

It is also possible to transmit the movement of the member 20 in the X-Y-plane to the movement of a cursor on a screen and to perform a "mouse click" by pressing in the Z-direction.

Furthermore, it is possible for the operator to make a haptic rotation R on the member 20, the amount of torque applied thereby being able to be used as a signal for the strength of a parameter to be selected by this rotation. The haptic rotation in R-direction simulates a rotary knob.

For an emergency, it may be provided that an operator simply beats against the robotic arm, indicated by arrow P. The robotic system recognizes by the force or the acceleration that it refers to such an emergency and then immediately stops its motion.

The haptic gestures are not limited to the foremost arm member 20. In principle, each individual arm member 10 may be provided with such functionality.

In addition, it is possible that the behavior of physical surfaces, keys or rotary knobs can be simulated by virtual, as freely programmable resistors when moving the robotic arm. In this way, the robotic system can be used by itself as an input or control device to activate complex systems and operations that are in a close functional relationship with the robotic system or its desired functionality.

The invention claimed is:

1. A robotic system, comprising:
at least one robotic arm;
a control unit for controlling the robotic arm;
a robotic arm sensor system; and
a display device with a graphical user interface,
wherein the control unit and robotic arm sensor system are designed to respond to predetermined forces and/or moments generated by haptic gestures of the user acting on the robotic arm, in which said control unit is designed to assign the forces and/or moments to at least one predetermined operation so that the robotic system performs said at least one predetermined operation associated with the haptic gesture,
wherein the control unit is further designed to assign said forces and/or moments generated by the haptic gesture with a navigation and selection control on the graphical user interface of said display device.

2. The robotic system according to claim 1, in which the forces and/or moments generated by the haptic gesture are assigned to different operations depending on their respective directions.

3. The robotic system according to claim 1, in which the forces and/or moments generated by the haptic gesture are assigned to different operations depending on their respective variables.

4. The robotic system according to claim 1, in which a different chronological sequence of haptic gestures is assigned to different operations.

5. The robotic system according to claim 1, in which the control unit is adapted to generate a feedback in response to the haptic gesture.

6. The robotic system according to claim 5, in which the feedback is auditory and/or visual.

7. The robotic system according to claim 5, in which the feedback is formed to be haptically detectable.

8. The robotic system according to claim 7, in which the compliance of the robotic arm is variable.

9. A method for controlling a graphical user interface of display device of a robotic system comprising at least one robotic arm, a control unit for controlling the robotic arm and a robotic arm sensor system, the method comprising the steps of:

manipulating the robotic arm by at least one predetermined force and/or moment generated by a haptic gesture;
generating signals by the robotic arm sensor system in response to the at least one predetermined force and/or moment generated by the haptic gesture;
transmitting the signals into the control unit; and
assigning the signals to different predetermined operations by the control unit, wherein the control unit assigns the signals with a navigation and selection control on the graphical user interface of the display device.

10. The method according to claim 9, further comprising the step of:
generating at least one feedback in dependence on the different predetermined operations.

11. The method according to claim 10, further comprising the step of:
adjusting the compliance of the robotic arm depending on a predetermined haptic gesture.

\* \* \* \* \*